(12) United States Patent
Wang et al.

(10) Patent No.: US 11,870,994 B2
(45) Date of Patent: Jan. 9, 2024

(54) METHOD, SYSTEM, DEVICE, AND COMPUTER-READABLE STORAGE MEDIUM FOR INVERSE QUANTIZATION

(71) Applicant: PEKING UNIVERSITY SHENZHEN GRADUATE SCHOOL, Shenzhen (CN)

(72) Inventors: Ronggang Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

(*) Notice: Subject to any disclaimer, the term of this patent is extended or adjusted under 35 U.S.C. 154(b) by 295 days.

(21) Appl. No.: 16/610,467

(22) PCT Filed: Mar. 6, 2019

(86) PCT No.: PCT/CN2019/077153
§ 371 (c)(1),
(2) Date: Nov. 30, 2021

(87) PCT Pub. No.: WO2020/172903
PCT Pub. Date: Sep. 3, 2020

(65) Prior Publication Data
US 2022/0116607 A1    Apr. 14, 2022

(30) Foreign Application Priority Data
Feb. 26, 2019    (CN) .......................... 201910141289.1

(51) Int. Cl.
*H04N 19/124*    (2014.01)
*H04N 19/103*    (2014.01)
(Continued)

(52) U.S. Cl.
CPC ......... *H04N 19/124* (2014.11); *H04N 19/103* (2014.11); *H04N 19/136* (2014.11); *H04N 19/176* (2014.11); *H04N 19/196* (2014.11)

(58) Field of Classification Search
CPC .. H04N 19/124; H04N 19/103; H04N 19/173; H04N 19/196
See application file for complete search history.

(56) References Cited

U.S. PATENT DOCUMENTS

| 8,923,390 B2 | 12/2014 | Au et al. |
| 2006/0133479 A1 | 6/2006 | Chen et al. |

(Continued)

FOREIGN PATENT DOCUMENTS

| CN | 1794815 A | 6/2006 |
| CN | 101931805 A | 12/2010 |
| CN | 106105206 A | 11/2016 |

*Primary Examiner* — On S Mung

(57) ABSTRACT

A method, system, device and computer-readable storage medium for inverse quantization. The method comprises: determining an initial weighted inverse quantization matrix, wherein, the initial weighted inverse quantization matrix is the same as the quantized block in size; setting some matrix elements in the initial weighted inverse quantization matrix to zero to obtain a weighted inverse quantization matrix, wherein, determining the matrix elements that need to be zeroed according to the size of the quantized block; weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

17 Claims, 3 Drawing Sheets

- 110: determining an initial weighted inverse quantization matrix
- 120: setting some matrix elements in the initial weighted inverse quantization matrix to zero to obtain a weighted inverse quantization matrix
- 130: weighted inverse quantizing the quantized coefficients in the quantized block to generate corresponding inverse transform coefficients

(51) Int. Cl.
*H04N 19/136* (2014.01)
*H04N 19/176* (2014.01)
*H04N 19/196* (2014.01)

(56) References Cited

U.S. PATENT DOCUMENTS

| | | | |
|---|---|---|---|
| 2011/0116725 A1* | 5/2011 | Chiang | H04N 19/124 382/251 |
| 2015/0117520 A1 | 4/2015 | Zhou | |
| 2015/0264403 A1 | 9/2015 | Chong et al. | |

* cited by examiner

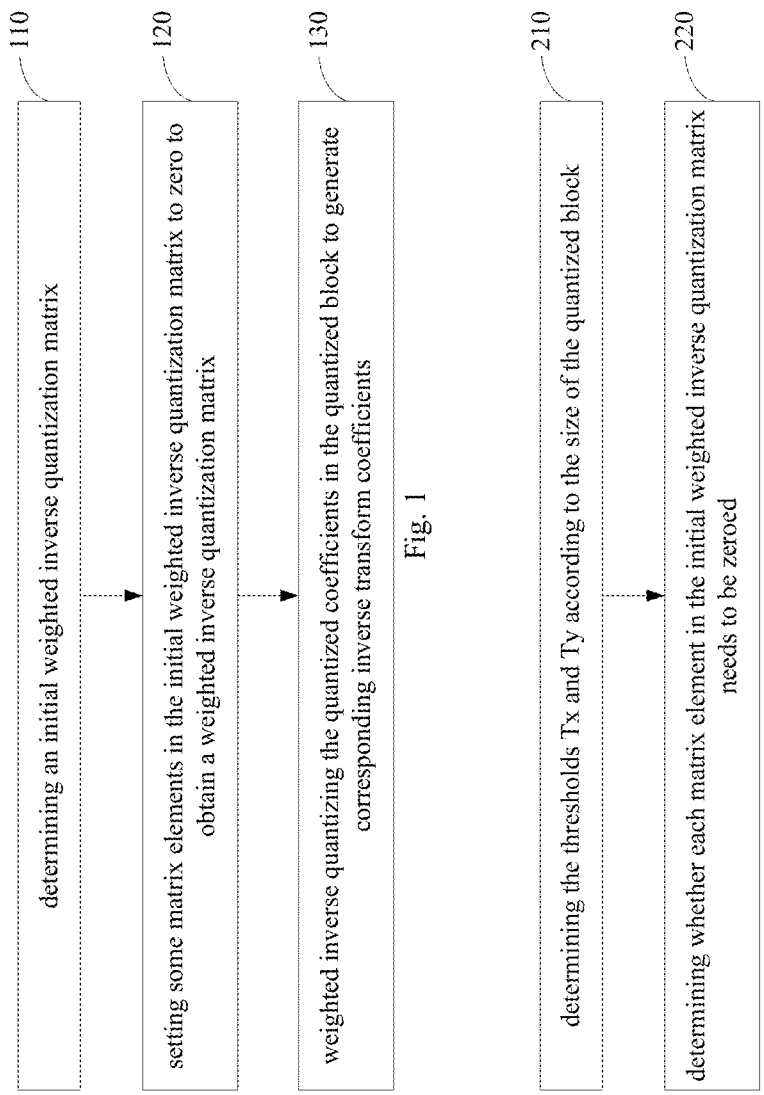

METHOD, SYSTEM, DEVICE, AND COMPUTER-READABLE STORAGE MEDIUM FOR INVERSE QUANTIZATION

This application claims priority to Chinese Patent Application No. CN201910141289.1, filed on Feb. 26, 2019, entitled "METHOD, SYSTEM, DEVICE, AND COMPUTER-READABLE STORAGE MEDIUM FOR INVERSE QUANTIZATION", which are hereby incorporated by reference in their entirety for all purposes.

FIELD

Embodiments of the present disclosure generally relate to the field of computer technology, and more particularly relate to a method, system, device and computer-readable storage medium for inverse quantization.

BACKGROUND

In the field of video coding/decoding, inverse quantization and inverse transform are the basis of the coding/decoding. Generally, the quantized block is inverse quantized to generate an inverse transform block, and the inverse transform block is inverse transformed to generate a residual image block.

At present, with the development of 4K TV technology and related applications, the new generation of video coding standard has also been proposed. Compared to previous video coding standards, the new generation of video coding standard allows for larger transform block. For example, the size of the transform block is 64×64.

However, in the video coding/decoding application scenario, the increase of the size of the transform block will increase the complexity of the inverse transform, thereby increasing the difficulty of implementing the decoder.

SUMMARY

The embodiments disclosed herein provide a method, system, device and computer-readable storage medium for inverse quantization for reducing the complexity of inverse transform in the video coding/decoding process in the prior art.

Accordingly, some embodiments provide a method for inverse quantization, comprising: determining an initial weighted inverse quantization matrix, wherein, the initial weighted inverse quantization matrix is the same as the quantized block in size; setting some matrix elements in the initial weighted inverse quantization matrix to zero to obtain a weighted inverse quantization matrix, wherein, determining the matrix elements that need to be zeroed according to the size of the quantized block; weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

In some embodiments, wherein, determining the matrix elements that need to be zeroed according to the size of the quantized block, comprising: determining the thresholds Tx and Ty according to the size of the quantized block; determining whether each matrix element in the initial weighted inverse quantization matrix needs to be zeroed, wherein, the initial weighted inverse quantization matrix is recorded as a two-dimensional array M, for the element M[x][y] in M, if x is not less than the threshold Tx or y is not less than the threshold Ty, then M [x][y] needs to be zeroed.

In some embodiments, wherein, determining the thresholds Tx and Ty according to the size of the quantized block, comprising: when the size of the quantized block is W×H, Tx is W, or W/2, or W/4, or W/8.

In some embodiments, wherein, determining the thresholds Tx and Ty according to the size of the quantized block, comprising: when the size of the quantized block is W×H, Ty is H, or H/2, or H/4, or H/8.

In some embodiments, wherein, determining the thresholds Tx and Ty according to the size of the quantized block, comprising: when the size of the quantized block is W×H, and W or H is not greater than 32, Tx or Ty is 32.

In some embodiments, wherein, Tx and Ty are 32.

In some embodiments, wherein, determining an initial weighted inverse quantization matrix, comprising: determining the initial weighted inverse quantization matrix according to a custom matrix transmitted by the sequence header.

In some embodiments, wherein, determining an initial weighted inverse quantization matrix, comprising: determining the initial weighted inverse quantization matrix according to a custom matrix transmitted by the image header.

In some embodiments, wherein, determining an initial weighted inverse quantization matrix, comprising: determining the initial weighted inverse quantization matrix according to default matrix.

In some embodiments, wherein, weighted inverse quantizing the quantized coefficients in the quantized block to generate corresponding inverse transform coefficients, comprising: calculating a temporary inverse transform coefficient according to the weight coefficient and the quantized coefficient; correcting the temporary inverse transform coefficient according to the size of the quantized block to obtain the inverse transform coefficient.

In some embodiments, wherein, calculating a temporary inverse transform coefficient according to the weight coefficient and the quantized coefficient, comprising: calculating the temporary inverse transform coefficient using Formula 1;

$$\text{Coeff}_{IT}'=\text{Clip3}(-32768.32767,\\(((((\text{Coeff}_q *w)>>w_s)*D)>>4)+2^{S+S1-1})>>(S+S1)), \quad \text{Formula 1:}$$

wherein:
Coeff$_q$ is the quantized coefficient;
Coeff$_{IT}'$ is the temporary inverse transform coefficient;
w is the weight coefficient;
w$_s$ is a weighted inverse quantized shift value;
D is a constant factor determined according to a quantization parameter QP;
S is a shift number determined according to the quantization parameter QP;
S1 is an additional shift number calculated according to the size of the current block and sample accuracy.

In some embodiments, wherein, correcting the temporary inverse transform coefficient according to the size of the quantized block to obtain the inverse transform coefficient, comprising: when the size of the quantized block is W×H, Coeff$_{IT}$ is calculated according to Formula 2 if W is twice H or H is twice W, otherwise, Coeff$_{IT}$ is calculated according to Formula 3;

$$\text{Coeff}_{IT}=(\text{Coeff}_{IT}'*181+128)>>8 \quad \text{Formula 2:}$$

$$\text{Coeff}_{IT}=\text{Coeff}_{IT}' \quad \text{Formula 3:}$$

wherein, Coeff$_{IT}'$ is the temporary inverse transform coefficient, Coeff$_{IT}$ is the inverse transform coefficient.

Some embodiments provide a method for video coding, comprising: obtaining a predicted image block; obtaining a first residual image block according to the predicted image block and an original image block; transforming and quantizing the first residual image block to generate a quantized block for writing a code stream; inverse quantizing the quantized block to generate an inverse transform block according to the method described in the above embodiments for inverse quantization; inverse transforming the inverse transform block to generate a second residual image block; obtaining a reconstructed image block according to the second residual image block and the predicted image block; deblocking filtering the reconstructed image composed of the reconstructed image block to obtain a reference image provided to subsequent frame references.

Some embodiments provide a method for video decoding, comprising: parsing the code stream to obtain the quantized block and the prediction information; obtaining a predicted image block according to the prediction information; inverse quantizing the quantized block to generate an inverse transform block according to the method described in the above embodiments for inverse quantization; inverse transforming the inverse transform block to generate a residual image block; obtaining a reconstructed image block according to the residual image block and the predicted image block; deblocking filtering the reconstructed image composed of the reconstructed image block to obtain a reference image provided to subsequent frame references.

Some embodiments provide a system for inverse quantization, comprising: an initial weighted inverse quantization matrix obtaining module, configured to determine an initial weighted inverse quantization matrix, wherein, the initial weighted inverse quantization matrix is the same as the quantized block in size; an inverse quantization matrix correction module, configured to set some matrix elements in the initial weighted inverse quantization matrix to zero to obtain a weighted inverse quantization matrix, wherein, determining the matrix elements that need to be zeroed according to the size of the quantized block; an inverse quantization calculation module, configured to weighted inverse quantize the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

Some embodiments provide a computer-readable storage medium, comprising: storing computer readable instruction; the computer readable instruction are executed by a processor to implement the method described in the above embodiments.

Some embodiments provide a device for inverse quantization, comprising: memory for storing computer program instructions and processor for executing program instructions, wherein when the processor executes the computer program instructions, triggering the device to execute the method described in the above embodiments.

The at least one technical solution used in the present specification can achieve the following beneficial effects: by controlling the distribution of non-zero coefficients in the weighted inverse quantization matrix, controlling the non-zero coefficients in the inverse transform block obtained by inverse quantization in a suitable region, thereby reducing the complexity of the inverse transform block, thereby effectively reducing the complexity of the inverse transform process and reducing the difficulty of implementing decoder.

BRIEF DESCRIPTION OF THE DRAWINGS

The accompanying drawings described here are used to provide a further understanding of the present specification, and constitute a part of the present specification. Example implementations of the present specification and descriptions of the implementations are used to explain the present specification, and constitute no improper limitation to the present specification. In the accompanying drawings:

FIG. 1 is a schematic diagram illustrating a method for inverse quantization, according to the present specification;

FIG. 2 is a schematic diagram illustrating some steps of the method for inverse quantization, according to the present specification;

DETAILED DESCRIPTION OF EMBODIMENTS

Figure 3:
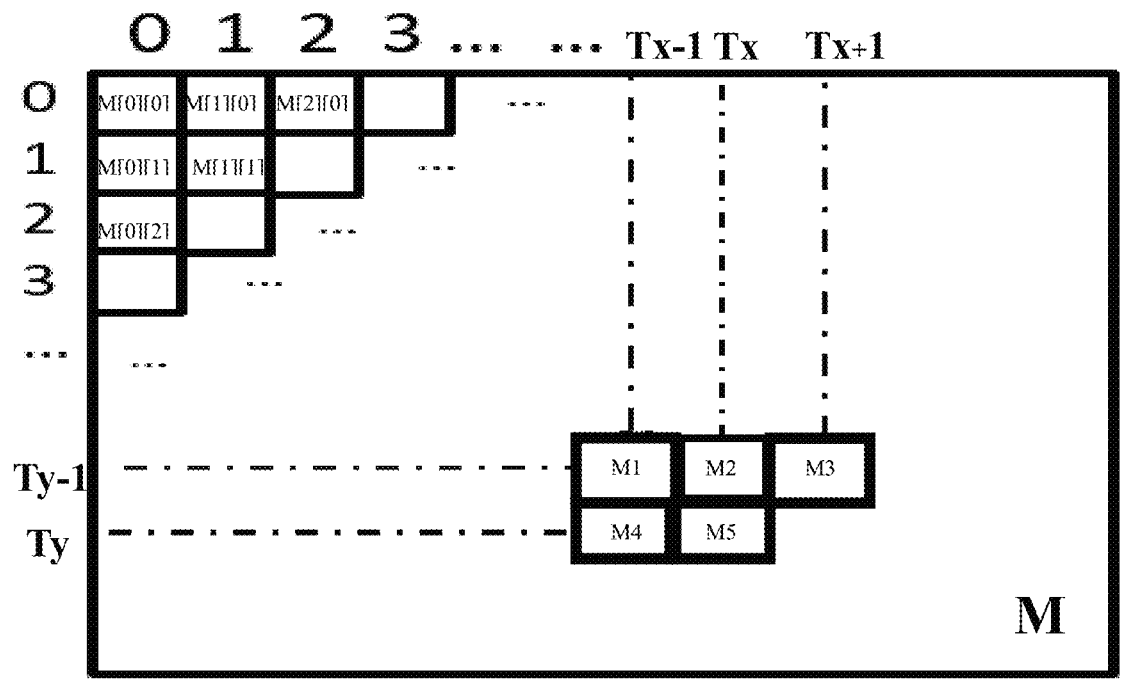
FIG. 3 is a schematic diagram illustrating the initial weighted inverse quantization matrix, according to the present specification.

To make a person skilled in the art better understand the technical solutions in one or more implementations of the present specification, the following clearly and completely describes the technical solutions in the one or more implementations of the present specification with reference to the accompanying drawings in the one or more implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

Compared to previous video coding standards, the new generation of video coding standard allows for larger transform block, for example, the size of the transform block is 64×64. However, in the video coding/decoding application scenario, the increase of the size of the transform block will increase the complexity of the inverse transform, thereby increasing the difficulty of implementing the decoder.

Therefore, the embodiments disclosed herein provide a method for inverse quantization. The main reason why the complexity of the inverse transform process in the prior art is too high is that the size of the inverse transform block is too large, and the number of the inverse transform coefficients included in the inverse transform block is excessive. Then, if some inverse transform coefficients in the inverse transform block are set to zero, the computational complexity of the inverse transform process can be reduced, thereby reducing the complexity of the inverse transform process.

In some embodiments, by controlling the distribution of non-zero coefficients in the weighted inverse quantization matrix, controlling the non-zero coefficients in the inverse transform block obtained by inverse quantization in a suitable region, thereby reducing the complexity of the inverse transform block, thereby effectively reducing the complexity of the inverse transform process and reducing the difficulty of implementing decoder.

The technical solutions provided by the embodiments will be described in detail below with reference to the accompanying drawings.

FIG. 1 is a schematic diagram illustrating a method for inverse quantization, according to the present specification. The method for inverse quantization includes the following steps.

S110, determining an initial weighted inverse quantization matrix, wherein, the initial weighted inverse quantization matrix is the same as the quantized block in size;

S120, setting some matrix elements in the initial weighted inverse quantization matrix to zero to obtain a weighted inverse quantization matrix, wherein, determining the matrix elements that need to be zeroed according to the size of the quantized block;

S130, weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization. wherein, weighted inverse quantizing each quantized coefficient in the quantized block to finally generate an inverse transform block.

Controlling the distribution of non-zero coefficients in the weighted inverse quantization matrix according to the method provided in this embodiment. In this way, when performing inverse quantization according to the matrix elements in the weighted inverse quantization matrix, controlling the non-zero coefficients in the inverse transform block obtained by inverse quantization in a suitable region, thereby reducing the complexity of the inverse transform block.

Further, in some embodiments, as shown in FIG. 2, determining the matrix elements that need to be zeroed according to the size of the quantized block, comprising:

S210, determining the thresholds Tx and Ty according to the size of the quantized block;

S220, determining whether each matrix element in the initial weighted inverse quantization matrix needs to be zeroed, wherein, the initial weighted inverse quantization matrix is recorded as a two-dimensional array M, for the element M[x][y] in M, if x is not less than the threshold Tx or y is not less than the threshold Ty, then M [x][y] needs to be zeroed.

As shown in FIG. 3, in some embodiments, the element in the initial weighted inverse quantization matrix M is denoted as M[x][y], for example, M[0][0], M[0][1], M[0][2], M[1][0], M[1][1], M[2][0]. M1 is M[Tx-1][Ty-1], which does not need to be set to zero; and M2~M5 need to be set to zero.

Further, in some embodiments, Tx and Ty are adaptive thresholds calculated from the size of the quantized block. Specifically, the size of the quantized block is W×H, and the corresponding Tx and Ty are respectively recorded as functions Tx(W, H) and Ty(W, H).

In some embodiments, when the size of the quantized block is W×H, Tx is W, or W/2, or W/4, or W/8.

In some embodiments, when the size of the quantized block is W×H, Ty is H, or H/2, or H/4, or H/8.

In the actual application scenario, Tx and Ty can be determined according to actual needs.

Further, in some embodiments, considering that for traditional application standards (such as the avs3 standard), when the effective data of the transform block is less than 32×32, the computational complexity does not need to be further reduced. Therefore, when W or H is not greater than 32, Tx or Ty is 32.

In an application scenario, when the size of the quantized block is 64×32, Tx is 32 and Ty is 32.

Further, in some embodiments, considering the traditional application standards (such as the avs3 standard), it is only necessary to limit the effective data of the transform block to not greater than 32, so Tx is 32 and Ty is 32. That is, for a quantized block whose size exceeds 32×32, it is determined whether the weight coefficients of the weighted inverse quantization are set to zero according to Tx being 32 and Ty being 32. For a quantized block whose size does not exceed 32×32, it is not necessary to zero the weight coefficients.

Further, in some embodiments, in determining the initial weighted inverse quantization matrix, the source of the initial weighted inverse quantization matrix may be a custom matrix transmitted according to the sequence header and/or the image header, or may be a default matrix.

Specifically, in some embodiments, determining the initial weighted inverse quantization matrix according to a custom matrix transmitted by the sequence header and/or the image header.

In some embodiments, determining the initial weighted inverse quantization matrix according to default matrix.

In some embodiments, determining the initial weighted inverse quantization matrix according to default matrix.

Figure 4:
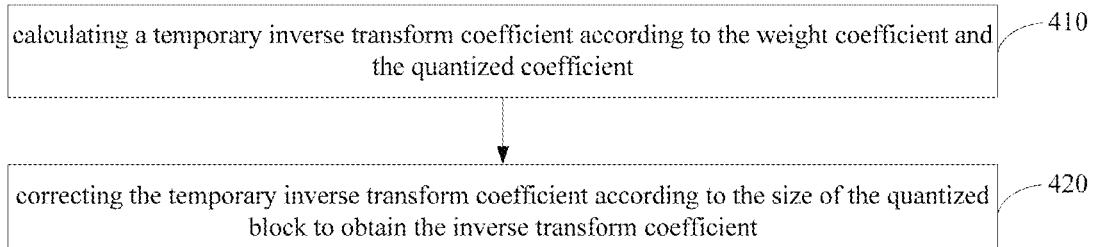
FIG. 4 is a schematic diagram illustrating some steps of the method for inverse quantization, according to the present specification.

Further, in some embodiments, as shown in FIG. 4, weighted inverse quantizing the quantized coefficients in the quantized block to generate corresponding inverse transform coefficients, comprising:

S410, calculating a temporary inverse transform coefficient according to the weight coefficient and the quantized coefficient;

S420, correcting the temporary inverse transform coefficient according to the size of the quantized block to obtain the inverse transform coefficient.

Specifically, in some embodiments, wherein, calculating a temporary inverse transform coefficient according to the weight coefficient and the quantized coefficient, comprising: calculating the temporary inverse transform coefficient using formula (1);

$$\text{Coeff}_{IT}' = \text{Clip3}(-32768, 32767, (((((\text{Coeff}_q * w) >> w_s) * D) >> 4) + 2^{S+S1-1}) >> (S+S1)), \quad (1), \text{wherein:}$$

$\text{Coeff}_q$ is the quantized coefficient;
$\text{Coeff}_{IT}'$ is the temporary inverse transform coefficient;
w is the weight coefficient;
$w_s$ is a weighted inverse quantized shift value;
D is a constant factor determined according to a quantization parameter QP;
S is a shift number determined according to the quantization parameter QP;
S1 is an additional shift number calculated according to the size of the current block and sample accuracy.

Specifically, in some embodiments, D is a constant factor obtained by looking up the table according to the quantization parameter QP.

Specifically, in some embodiments, S is a shift number obtained by looking up the table according to the quantization parameter QP.

Specifically, in some embodiments, D and S can be obtained by checking the following table according to the quantization parameter QP.

TABLE 1

| QP | D | S |
|---|---|---|
| 0 | 32768 | 14 |
| 1 | 36061 | 14 |
| 2 | 38968 | 14 |
| 3 | 42495 | 14 |
| 4 | 46341 | 14 |
| 5 | 50535 | 14 |
| 6 | 55437 | 14 |
| 7 | 60424 | 14 |
| 8 | 32932 | 13 |
| 9 | 35734 | 13 |
| 10 | 38968 | 13 |
| 11 | 42495 | 13 |
| 12 | 46177 | 13 |
| 13 | 50535 | 13 |
| 14 | 55109 | 13 |
| 15 | 59933 | 13 |
| 16 | 65535 | 13 |
| 17 | 35734 | 12 |
| 18 | 38968 | 12 |
| 19 | 42577 | 12 |
| 20 | 46341 | 12 |
| 21 | 50617 | 12 |
| 22 | 55027 | 12 |
| 23 | 60097 | 12 |
| 24 | 32809 | 11 |
| 25 | 35734 | 11 |
| 26 | 38968 | 11 |
| 27 | 42454 | 11 |
| 28 | 46382 | 11 |
| 29 | 50576 | 11 |
| 30 | 55109 | 11 |
| 31 | 60056 | 11 |
| 32 | 65535 | 11 |
| 33 | 35734 | 10 |
| 34 | 38968 | 10 |
| 35 | 42495 | 10 |
| 36 | 46320 | 10 |
| 37 | 50515 | 10 |
| 38 | 55109 | 10 |
| 39 | 60076 | 10 |
| 40 | 65535 | 10 |
| 41 | 35744 | 9 |
| 42 | 38968 | 9 |
| 43 | 42495 | 9 |
| 44 | 46341 | 9 |
| 45 | 50535 | 9 |
| 46 | 55099 | 9 |
| 47 | 60087 | 9 |
| 48 | 65535 | 9 |
| 49 | 35734 | 8 |
| 50 | 38973 | 8 |
| 51 | 42500 | 8 |
| 52 | 46341 | 8 |
| 53 | 50535 | 8 |
| 54 | 55109 | 8 |
| 55 | 60097 | 8 |
| 56 | 32771 | 7 |
| 57 | 35734 | 7 |
| 58 | 38965 | 7 |
| 59 | 42497 | 7 |
| 60 | 46341 | 7 |
| 61 | 50535 | 7 |
| 62 | 55109 | 7 |
| 63 | 60099 | 7 |
| 64 | 32768 | 6 |
| 65 | 36061 | 6 |
| 66 | 38968 | 6 |
| 67 | 42495 | 6 |
| 68 | 46341 | 6 |
| 69 | 50535 | 6 |
| 70 | 55437 | 6 |
| 71 | 60424 | 6 |
| 72 | 32932 | 5 |
| 73 | 35734 | 5 |
| 74 | 38968 | 5 |
| 75 | 42495 | 5 |
| 76 | 46177 | 5 |
| 77 | 50535 | 5 |
| 78 | 55109 | 5 |
| 79 | 59933 | 5 |

Specifically, in some embodiments, $w_s$ is 2.

Specifically, in some embodiments, calculate S1 according to formula (2);

$$S1 = m + \text{bitdepth} - 14; \quad (2)$$

wherein, bitdepth is the sample precision.

Specifically, in some embodiments, correcting the temporary inverse transform coefficient according to the size of the quantized block to obtain the inverse transform coefficient, comprising: when the size of the quantized block is W×H, $\text{Coeff}_{IT}$ is calculated according to formula (3) if W is twice H or H is twice W, otherwise, $\text{Coeff}_{IT}$ is calculated according to formula (4);

$$\text{Coeff}_{IT} = (\text{Coeff}_{IT}' * 181 + 128) >> 8 \quad (3)$$

$$\text{Coeff}_{IT} = \text{Coeff}_{IT}' \quad (4)$$

wherein, $\text{Coeff}_{IT}'$ is the temporary inverse transform coefficient, $\text{Coeff}_{IT}$ is the inverse transform coefficient.

Further, based on the inverse quantization method mentioned in the above embodiments, some embodiments provide a method for video coding. Specifically, in some embodiments, a method for video coding, comprising: obtaining a predicted image block; obtaining a first residual image block according to the predicted image block and an original image block; transforming and quantizing the first residual image block to generate a quantized block for writing a code stream; inverse quantizing the quantized block to generate an inverse transform block according to the method described in the above embodiments for inverse quantization; inverse transforming the inverse transform block to generate a second residual image block; obtaining a reconstructed image block according to the second residual image block and the predicted image block; deblocking filtering the reconstructed image composed of the reconstructed image block to obtain a reference image provided to subsequent frame references.

Specifically, in an application scenario, in a video encoding process, an image block composed of prediction pixels obtained by a prediction technique is referred to as a prediction image block; when encoding one frame of image, the image is divided into coding units of different sizes for encoding; the coding unit is divided into one or more prediction units, and the coding unit is also divided into one or more transformation units; the coding unit predicts the prediction unit by using an intra mode or an inter mode, and obtains a prediction image block corresponding to the prediction unit; subtracting the predicted image block corresponding to the transformation unit from the original image block corresponding to the transformation unit to obtain a residual image block Resi; The residual image block Resi is transformed and quantized to obtain a quantized block; the division information of the prediction unit and the transformation unit, the prediction mode, the quantization block, and the like are written into the code stream by entropy coding.

The quantized block is inverse quantized according to the quantization parameter, the method described in the embodiments of the present specification for inverse quantization, and the corresponding weighted inverse quantization matrix to obtain an inverse transform block; the inverse transform block obtains the residual image block Resi' by inverse transform; the residual image block Resi' is added to the corresponding predicted image block to obtain a reconstructed image block; the reconstructed image composed of the reconstructed image block is filtered by the loop and provided to subsequent frame references.

Further, based on the inverse quantization method mentioned in the above embodiments, some embodiments provide a method for video decoding. Specifically, in some embodiments, a method for video decoding, comprising: parsing the code stream to obtain the quantized block and the prediction information; obtaining a predicted image block according to the prediction information; inverse quantizing the quantized block to generate an inverse transform block according to the method described in the above embodiments for inverse quantization; inverse transforming the inverse transform block to generate a residual image block; obtaining a reconstructed image block according to the residual image block and the predicted image block; deblocking filtering the reconstructed image composed of the reconstructed image block to obtain a reference image provided to subsequent frame references.

Figure 5:
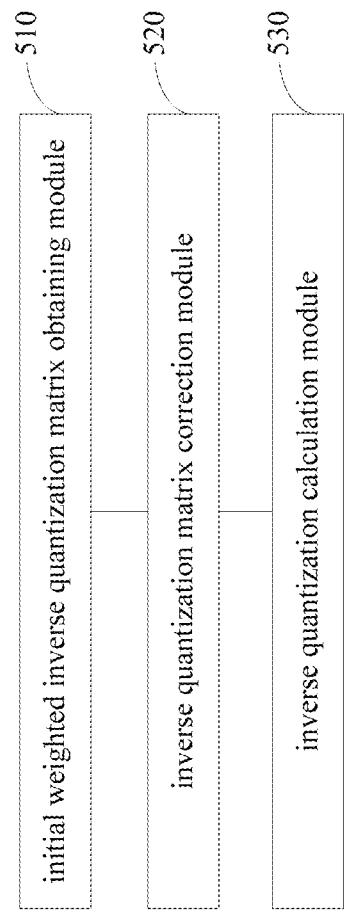
FIG. 5 is a schematic diagram illustrating a system for inverse quantization, according to the present specification.

Further, based on the inverse quantization method mentioned in the above embodiments, some embodiments provide a system for inverse quantization. Specifically, as shown in FIG. 5, a system for inverse quantization, comprising: an initial weighted inverse quantization matrix obtaining module 510, configured to determine an initial weighted inverse quantization matrix, wherein, the initial weighted inverse quantization matrix is the same as the quantized block in size; an inverse quantization matrix correction module 520, configured to set some matrix elements in the initial weighted inverse quantization matrix to zero to obtain a weighted inverse quantization matrix, wherein, determining the matrix elements that need to be zeroed according to the size of the quantized block; an inverse quantization calculation module 530, configured to weighted inverse quantize the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

Further, based on the inverse quantization method mentioned in the above embodiments, an embodiment provides a computer-readable storage medium, comprising: storing computer readable instruction; the computer readable instruction are executed by a processor to implement the method described in the above embodiments.

Further, based on the inverse quantization method mentioned in the above embodiments, an embodiment provides a device for inverse quantization, comprising: memory for storing computer program instructions and processor for executing program instructions, wherein when the processor executes the computer program instructions, triggering the device to execute the method described in the above embodiments.

In the 1990s, a technology improvement can be clearly distinguished between a hardware improvement (for example, an improvement on a circuit structure such as a diode, a transistor, or a switch) and a software improvement (an improvement on a method process). However, with the development of technologies, an improvement on many method processes can be considered as a direct improvement on a hardware circuit structure. Almost all designers program an improved method process to a hardware circuit, to obtain a corresponding hardware circuit structure. Therefore, it cannot be considered that an improvement on a method process cannot be implemented by using a hardware entity module. For example, a programmable logic device (PLD) (for example, a field programmable gate array (FPGA)) is a type of an integrated circuit. A logical function of the programmable logic device is determined by a user through device programming. The designers perform voluntary programming to "integrate" a digital system into a single PLD without requiring a chip manufacturer to design and produce a dedicated integrated circuit chip. In addition, nowadays, instead of manually producing an integrated circuit chip, the programming is mostly implemented by "logic compiler" software, which is similar to a software compiler used during program development. Original code before compiling also needs to be written in a specific programming language, which is referred to as a hardware description language (HDL). There is more than one type of HDL, such as the ABEL (Advanced Boolean Expression Language). AHDL (Altera Hardware Description Language), Confluence, CUPL (Cornell University Programming Language), HDCal, JHDL (Java Hardware Description Language). Lava, Lola, MyHDL, PALASM, and RHDL (Ruby Hardware Description Language). Currently, the VHDL (Very-High-Speed Integrated Circuit Hardware Description Language) and Verilog are most commonly used. A person skilled in the art should also understand that a hardware circuit implementing a logical method process can be easily obtained provided that the method process is logically programmed to an integrated circuit by using the previous hardware description languages.

A controller can be implemented in any appropriate methods. For example, the controller can be a microprocessor or a processor, or a computer readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT9ISAM, Microchip PIC18F26K20, and Silicone Labs C8051F320. The memory controller can also be implemented as a part of control logic of a memory. A person skilled in the art also knows that in addition to implementing the controller by using only computer readable program code, the steps in the method can be logically programmed to enable the controller to implement same functions in forms of a logic gate, a switch, an ASIC, a programmable logic controller, an embedded microcontroller, etc. Therefore, such a controller can be considered as a hardware component. An apparatus that is included in the controller and that is configured to implement various functions can be considered as a structure inside the hardware component. Alternatively, an apparatus configured to implement various functions can even be considered as both a software module for implementing the method and a structure inside the hardware component.

The system, apparatus, module, or unit illustrated in the previous implementations can be implemented by using a computer chip or an entity or can be implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus is described by dividing the apparatus into various units based on functions. Certainly, when the present specification is implemented, the functions of the units can be implemented in one or more pieces of software and/or hardware.

A person skilled in the art should understand that the implementations of the present specification can be provided as a method, a system, or a computer program product. Therefore, the present specification can use a form of hardware only implementations, software only implementations, or implementations with a combination of software and hardware. In addition, the present specification can use a form of a computer program product implemented on one or more computer-usable storage media (including but not limited to a magnetic disk storage, a CD-ROM, an optical memory, etc.) that include computer-usable program code.

The present specification is described with reference to the flowcharts and/or block diagrams of the method, the device (system), and the computer program product according to one or more implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided to a general-purpose computer, a dedicated computer, an embedded processor, or a processor of another programmable data processing device, to generate a machine, so that the instructions executed by a computer or a processor of another programmable data processing device generate an apparatus for implementing a specified function in one or more processes in the flowcharts and/or in one or more blocks in the block diagrams.

These computer program instructions can alternatively be stored in a computer readable memory that can instruct a computer or another programmable data processing device to work in a specific method, so that the instructions stored in the computer readable memory generate an artifact that includes an instruction apparatus. The instruction apparatus implements a specified function in one or more processes in the flowcharts and/or in one or more blocks in the block diagrams.

These computer program instructions can alternatively be loaded to a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more central processing units (CPU), an input/output interface, a network interface, and a memory.

The memory can include a non-persistent memory, a random access memory (RAM), a nonvolatile memory, and/or another form in a computer readable medium, for example, a read-only memory (ROM) or a flash memory (flash memory). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information accessible to the computing device. As defined in the present specification, the computer readable medium does not include computer readable transitory media (transitory media) such as a modulated data signal and a carrier.

It is worthwhile to note that the term "include", "comprise", or their any other variants are intended to cover a non-exclusive inclusion, so that a process, a method, a commodity, or a device that includes a series of elements not only includes those elements but also includes other elements that are not expressly listed, or further includes elements inherent to such process, method, commodity, or device. An element proceeded by "includes a . . . " does not, without more constraints, preclude the existence of additional identical elements in the process, method, commodity, or device that includes the element.

The present specification can be described in the general context of a computer executable instruction executed by a computer, for example, a program module. Generally; the program module includes a routine, a program, an object, a component, a data structure, etc. for executing a particular task or implementing a particular abstract data type. The one or more implementations of the present specification can also be practiced in distributed computing environments. In the distributed computing environments, tasks are executed by remote processing devices that are connected to each other by using a communications network. In the distributed computing environments, the program module can be located in both local and remote computer storage media including storage devices.

The implementations of the present specification are all described in a progressive way. For the same or similar parts in the implementations, references can be made to each other. Each implementation focuses on a difference from other implementations. Particularly, a system implementation is basically similar to a method implementation, and therefore is briefly described. For relevant parts, references can be made to some descriptions in the method implementation.

The previous descriptions are merely one or more implementations of the present specification, and are not intended to limit the present specification. For a person skilled in the art, the one or more implementations of the present specification can have various modifications and changes. Any modification, equivalent replacement, improvement, etc. made without departing from the spirit and principle of the one or more implementations of the present specification shall fall within the scope of the claims of the present specification.

We claim:

1. A method for inverse quantization, comprising:
   determining an initial weighted inverse quantization matrix, wherein, the initial weighted inverse quantization matrix is the same as the quantized block in size;
   setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

2. A method for inverse quantization, comprising:
determining an initial weighted inverse quantization matrix, wherein, the initial weighted inverse quantization matrix is the same as the quantized block in size;
setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization;
wherein,
determining the matrix elements that need to be zeroed according to the size of the quantized block, comprising:
determining the thresholds Tx and Ty according to the size of the quantized block;
determining whether each matrix element in the initial weighted inverse quantization matrix needs to be zeroed, wherein, the initial weighted inverse quantization matrix is recorded as a two-dimensional array M, for the element M[x][y] in M, if x is not less than the threshold Tx or y is not less than the threshold Ty, then M [x][y] needs to be zeroed.

3. The method of claim 2, wherein,
determining the thresholds Tx and Ty according to the size of the quantized block, comprising:
when the size of the quantized block is W×H,
Tx is W, or W/2, or W/4, or W/8.

4. The method of claim 2, wherein,
determining the thresholds Tx and Ty according to the size of the quantized block, comprising:
when the size of the quantized block is W×H, Ty is H, or H/2, or H/4, or H/8.

5. The method of claim 2, wherein,
determining the thresholds Tx and Ty according to the size of the quantized block, comprising:
when the size of the quantized block is W×H, and W or H is not greater than 32, Tx or Ty is 32.

6. The method of claim 2, wherein,
Tx and Ty are 32.

7. A method for inverse quantization, comprising:
determining an initial weighted inverse quantization matrix, wherein, the initial weighted inverse quantization matrix is the same as the quantized block in size;
setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization;
wherein,
determining an initial weighted inverse quantization matrix, comprising:
determining the initial weighted inverse quantization matrix according to a custom matrix transmitted by the sequence header.

8. A method for inverse quantization, comprising:
determining an initial weighted inverse quantization matrix, wherein, the initial weighted inverse quantization matrix is the same as the quantized block in size;
setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization;
wherein,
determining an initial weighted inverse quantization matrix, comprising:
determining the initial weighted inverse quantization matrix according to a custom matrix transmitted by the image header.

9. The method of claim 1, wherein,
determining an initial weighted inverse quantization matrix, comprising:
determining the initial weighted inverse quantization matrix according to default matrix.

10. The method of any of claims 1-9, wherein,
weighted inverse quantizing the quantized coefficients in the quantized block to generate corresponding inverse transform coefficients, comprising:
calculating a temporary inverse transform coefficient according to the weight coefficient and the quantized coefficient;
correcting the temporary inverse transform coefficient according to the size of the quantized block to obtain the inverse transform coefficient.

11. A method for inverse quantization, comprising:
determining an initial weighted inverse quantization matrix, wherein, the initial weighted inverse quantization matrix is the same as the quantized block in size;
setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization;
wherein,
calculating a temporary inverse transform coefficient according to the weight coefficient and the quantized coefficient, comprising:

calculating the temporary inverse transform coefficient using Formula 1;

$$\text{Coeff}_{IT}'=\text{Clip3}(-32768,32767,\\ (((((\text{Coeff}_Q*w)?w_s)*D)?4)+2^{S+S1-1})?(S+S1)) \quad \text{Formula 1:}$$

wherein:
Coeff$_Q$ is the quantized coefficient;
Coeff$_{IT}'$ is the temporary inverse transform coefficient;
w is the weight coefficient;
$w_s$ is a weighted inverse quantized shift value;
D is a constant factor determined according to a quantization parameter QP;
S is a shift number determined according to the quantization parameter QP;
S1 is an additional shift number calculated according to the size of the current block and sample accuracy.

12. A method for inverse quantization, comprising:
determining an initial weighted inverse quantization matrix, wherein, the initial weighted inverse quantization matrix is the same as the quantized block in size;
setting some matrix elements in the initial weighted inverse quantization matrix to zero to obtain a weighted inverse quantization matrix, wherein, determining the matrix elements that need to be zeroed according to the size of the quantized block;
weighted inverse quantizing the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization;
wherein,
correcting the temporary inverse transform coefficient according to the size of the quantized block to obtain the inverse transform coefficient, comprising:
when the size of the quantized block is W×H, Coeff$_{IT}$ is calculated according to Formula 2 if W is twice H or H is twice W, otherwise, Coeff$_{IT}$ is calculated according to Formula 3;

$$\text{Coeff}_{IT}=(\text{Coeff}_{IT}'*181+128)?8 \quad \text{Formula 2:}$$

$$\text{Coeff}_{IT}=\text{Coeff}_{IT}' \quad \text{Formula 3:}$$

wherein, Coeff$_{IT}'$ is the temporary inverse transform coefficient, Coeff$_{IT}$ is the inverse transform coefficient.

13. A method for video coding, comprising:
obtaining a predicted image block;
obtaining a first residual image block according to the predicted image block and an original image block;
transforming and quantizing the first residual image block to generate a quantized block for writing a code stream;
inverse quantizing the quantized block to generate an inverse transform block according to the method of any of claims 1-12;
inverse transforming the inverse transform block to generate a second residual image block;
obtaining a reconstructed image block according to the second residual image block and the predicted image block;
deblocking filtering the reconstructed image composed of the reconstructed image block to obtain a reference image provided to subsequent frame references.

14. A method for video decoding, comprising:
parsing the code stream to obtain the quantized block and the prediction information;
obtaining a predicted image block according to the prediction information;
inverse quantizing the quantized block to generate an inverse transform block according to the method of any of claims 1-12;
inverse transforming the inverse transform block to generate a residual image block;
obtaining a reconstructed image block according to the residual image block and the predicted image block;
deblocking filtering the reconstructed image composed of the reconstructed image block to obtain a reference image provided to subsequent frame references.

15. A system for inverse quantization, comprising:
an initial weighted inverse quantization matrix obtaining module, configured to determine an initial weighted inverse quantization matrix, wherein, the initial weighted inverse quantization matrix is the same as the quantized block in size;
an inverse quantization matrix correction module, configured to set some matrix elements in the initial weighted inverse quantization matrix to zero to obtain a weighted inverse quantization matrix, wherein, determining the matrix elements that need to be zeroed according to the size of the quantized block;
an inverse quantization calculation module, configured to weighted inverse quantize the quantized coefficients in the quantized block to generate corresponding inverse transform coefficients, wherein, the value of the matrix element corresponding to the position of the quantized coefficient in the weighted inverse quantization matrix is used as a weight coefficient of the weighted inverse quantization.

16. A non-transitory computer-readable storage medium, comprising:
storing computer readable instruction, wherein, the computer readable instruction are executed by a processor to implement the method of any of claims 1-14.

17. A device for inverse quantization, comprising:
memory for storing computer program instructions and processor for executing program instructions, wherein when the processor executes the computer program instructions, triggering the device to execute the method of any of claims 1-14.

* * * * *